Feb. 26, 1924.
J. L. FUNK
WHEELBARROW
Filed Feb. 27, 1923
1,485,179
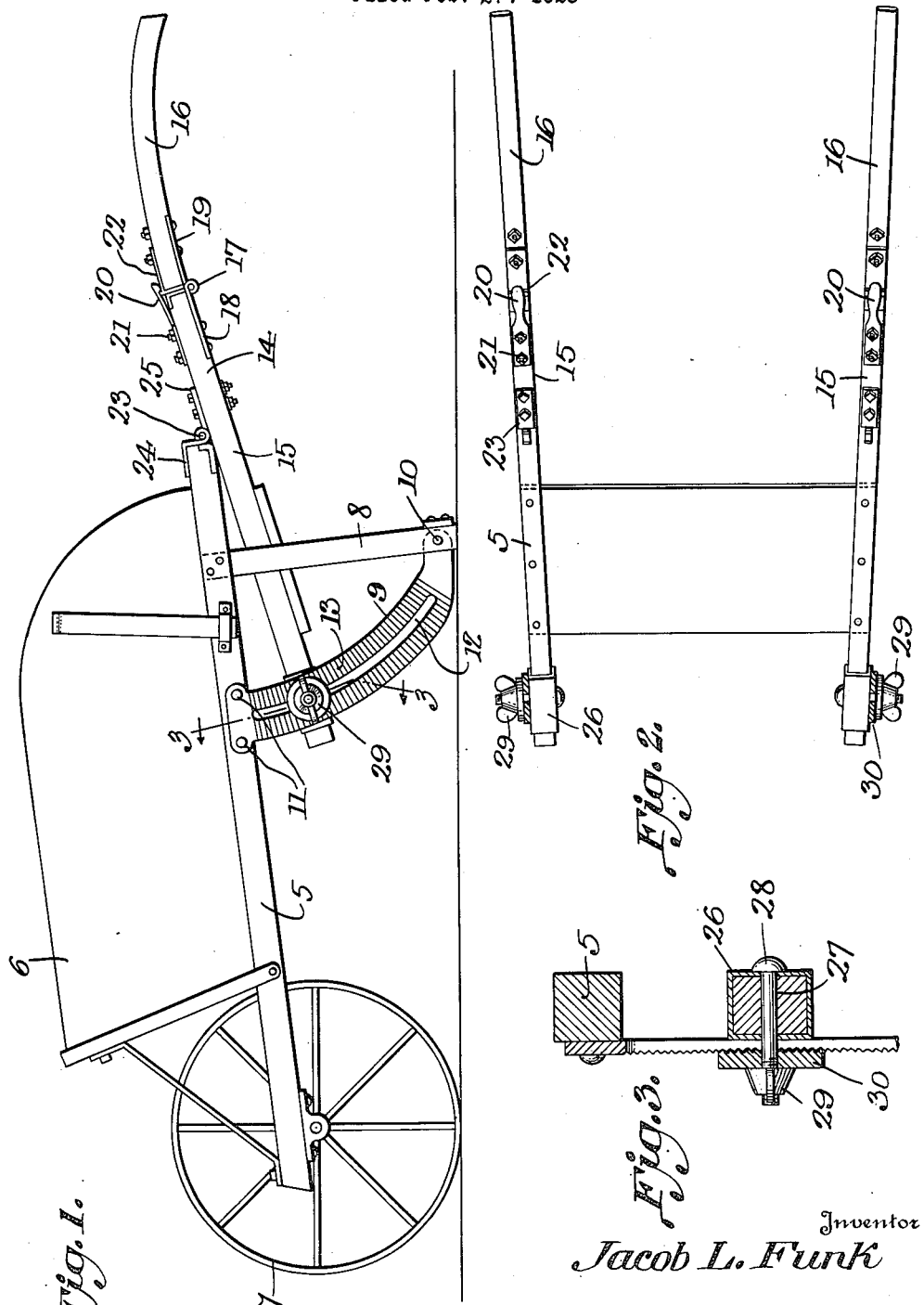
Inventor
Jacob L. Funk
By B. P. Fishburne
Attorney Patented Feb. 26, 1924.

1,485,179

UNITED STATES PATENT OFFICE.

JACOB L. FUNK, OF VALLEJO, CALIFORNIA.

WHEELBARROW.

Application filed February 27, 1923. Serial No. 621,572.

*To all whom it may concern:*

Be it known that I, JACOB L. FUNK, a citizen of the United States, residing at Vallejo, in the county of Solano and State of California, have invented certain new and useful Improvements in Wheelbarrows, of which the following is a specification.

My invention relates to improvements in wheel barrows.

An important object of the invention is to provide means whereby the handles of the wheel barrow may be angularly adjusted with respect to the longitudinal side bars, whereby the wheel barrow may be conveniently worked by men of different heights.

A further object of the invention is to so arrange the several parts of the wheel barrow that the angularly adjustable handles are clamped in adjustment to the diagonal braces of the legs of the wheel barrow, thus simplifying the construction.

A further object of the invention is to provide means whereby the handles of the wheel barrow may be broken, when the wheel barrow is shifted upwardly to a position for dumping, thereby dispensing with the necessity of the operator changing his hold or grip upon the handles.

A further object of the invention is to provide a wheel barrow of the above mentioned character, which is of extremely simple construction, strong and durable.

Other objects and advantages of the invention will be apparent during the course of the following description.

In the accompanying drawings forming a part of this specification, and in which like numerals are employed to designate like parts throughout the same, Figure 1 is a side elevation of a wheel barrow embodying my invention, Figure 2 is a plan view of the handles, and, Figure 3 is a detail section taken on line 3—3 of Figure 1.

In the drawings, wherein for the purpose of illustration is shown a preferred embodiment of my invention, the numeral 5 designates the longitudinal side bars of a wheel barrow, of any well known or preferred type. These side bars carry the body 6 and are supported at their forward ends, by a wheel 7, as shown.

At their rear ends, the side bars 5 have depending legs 8, rigidly secured thereto, which have connection at their lower ends with diagonal segmental braces 9, as shown at 10. These diagonal braces are rigidly secured, at their upper ends, to the side bars 5, as shown at 11. The diagonal segmental braces 9 are provided with curved slots 12, and have transverse serrations or teeth 13, as shown.

The numeral 14 designates handles, each of which includes a forward handle section 15, and a rear handle section 16. Each handle section 16 has a knee joint connection with the corresponding handle section 15, by means of a hinge 17, embodying leaves 18 and 19, rigidly secured to the handle sections, as shown. As clearly illustrated in Figure 1, the handle section 16 is locked against swinging movement, with relation to the handle section 15, upwardly beyond its point of longitudinal alinement therewith, but may be swung downwardly with relation to the handle section 15. Means are provided to lock the handle section 16 in the upper position, including a stiff headed catch 20, secured to the handle section 15, by bolts 21 or the like. This headed catch is adapted to engage over a coacting headed catch 22, bolted to the handle section 16, as shown.

Each handled section 15 is arranged beneath the forward end of the longitudinal side bar 5 and is pivotally connected therewith, to swing in a vertical plane longitudinally of the bar 5, by means of a hinge 23. This hinge embodies a leaf 24, rigidly secured to the bar 5, and a leaf 25, bolted or otherwise rigidly secured to the handle section 15.

At its forward end, the handle section 15 is preferably provided with a sleeve 26, and this handle section is provided with an opening 27, receiving a bolt 28. This bolt has its outer end screw-threaded for receiving a winged clamp nut 29, engaging a serrated washer or locking element 30, carried by the bolt 27, and engaging the serrations 13 of the diagonal brace 9. The bolt 27 passes through the segmental slot 12. Particular attention is called to the fact that the segmental diagonal brace 9 and its curved slot 12, are concentric with respect to the pivot 23, and hence by unscrewing the winged nut 29 the handle 14 may be quickly angularly adjusted, and subsequently locked in adjustment at the desired angular position.

The construction is simplified, inasmuch as the diagonal brace 9, which is essential to properly strengthening the leg 8, is employed as an element of the locking means for the handle.

In view of the foregoing description, it will be seen that simple and reliable means are provided whereby the handle 14 may be angularly adjusted with respect to the side bar 5, and locked in adjustment at a selected angular position. Further, the handle section 16 may be readily broken by downward pressure thereon, when the wheel barrow is being swung to the upright position, in dumping.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. A wheel barrow having longitudinal side bars and legs depending therefrom, generally diagonal braces connecting the legs to the side bars, handles arranged beneath the rear ends of the side bars and pivotally connected therewith to swing vertically longitudinally of the side bars, and means to clamp the forward ends of the handles to the diagonal braces at selected adjusted positions.

2. A wheel barrow having longitudinal side bars and legs depending therefrom, generally diagonal braces connecting the legs to the side bars, handles extending longitudinally of the side bars and pivotally connected therewith to swing vertically longitudinally of the side bars, and means to clamp the forward ends of the handles to the diagonal braces at selected adjusted positions.

3. A wheel barrow having longitudinal side bars and legs depending therefrom, generally diagonal braces arranged in advance of the legs and connecting the legs to the side bars and having curved slots, handles arranged beneath the rear ends of the side bars and hinged thereto to swing vertically longitudinally of the side bars, said curved slots being concentric with the pivot points of the handles, and adjustable clamping bolts carried by the forward ends of the handles and operating within said curved slots.

In testimony whereof I affix my signature.

JACOB L. FUNK.